United States Patent [19]
Eike et al.

[11] Patent Number: 4,789,190
[45] Date of Patent: Dec. 6, 1988

[54] SYSTEM FOR IMPROVING THE GRIPPING POWER OF A VEHICLE WHEEL ON A SUPPORT

[75] Inventors: Einar Eike, Tvedestrand; Ragnvald Skarelven, Drangedal, both of Norway

[73] Assignee: UC System A/S, Tvedestrand, Norway

[21] Appl. No.: 33,090
[22] PCT Filed: Jun. 23, 1986
[86] PCT No.: PCT/NO86/00042
§ 371 Date: Apr. 20, 1987
§ 102(e) Date: Apr. 20, 1987
[87] PCT Pub. No.: WO87/00126
PCT Pub. Date: Jan. 15, 1987

[30] Foreign Application Priority Data
Jun. 26, 1985 [NO] Norway .................. 852575

[51] Int. Cl.⁴ .................... B60B 39/02
[52] U.S. Cl. .................... 291/6; 291/23; 291/43; 239/112; 239/352; 118/320
[58] Field of Search .............. 291/1, 3, 6, 12, 16, 291/22, 23, 38, 41, 43; 222/608, 611; 239/112, 304, 352, 373; 118/300, 313, 320; 106/36

[56] References Cited

U.S. PATENT DOCUMENTS

| | | | |
|---|---|---|---|
| 1,824,815 | 9/1931 | Fuchs | 291/39 X |
| 2,275,647 | 3/1942 | Pickert | 291/3 |
| 2,638,369 | 5/1953 | Saari et al. | 291/11.2 |
| 2,921,918 | 1/1960 | Mooney et al. | 106/36 X |
| 3,271,060 | 9/1966 | Kilgore et al. | 291/3 |
| 3,336,064 | 8/1967 | Dzaack | 291/3 X |
| 3,345,098 | 10/1967 | Kilgore | 291/3 |
| 3,455,588 | 4/1969 | Frantz | 291/3 |
| 3,888,524 | 6/1975 | Lee | 291/3 X |
| 4,230,045 | 10/1980 | Fearon | 291/1 X |
| 4,324,363 | 4/1982 | Rauen, Jr. | 239/284 X |
| 4,529,127 | 7/1985 | Huszagh | 239/112 |

FOREIGN PATENT DOCUMENTS

| | | |
|---|---|---|
| 571618 | 2/1933 | Fed. Rep. of Germany . |
| 2716110 | 10/1978 | Fed. Rep. of Germany . |
| 3107219A1 | 9/1982 | Fed. Rep. of Germany . |
| 0273285 | 2/1928 | United Kingdom ......... 239/373 |

*Primary Examiner*—Robert B. Reeves
*Assistant Examiner*—Scott H. Werny
*Attorney, Agent, or Firm*—Cushman, Darby & Cushman

[57] ABSTRACT

A system for improving the power of vehicle wheels on a support, e.g. a winter slippery surface, has nozzles near the wheels supplied with a sticky or tacky liquid from a container under the control of the driver. The container is connected with a doser and with a source of compressed air, e.g. compressor, which is used for both application of the liquid to the wheels and cleaning the nozzles. The system includes a dosing reservoir and a three-way valve, the container being connected with a first branch of the valve, the dosing reservoir being connected with a second branch of the valve, nozzles being connected with the third branch of the valve. A first conduit extends from the compressor to the reservoir for application of the liquid and a second conduit extends from the compressor to the nozzles for cleaning the same. Alternatively, dosing may be carried out by the aid of time controlled dosing directly from the container and time controlled supply of compressed air to the nozzles.

6 Claims, 3 Drawing Sheets

SYSTEM FOR IMPROVING THE GRIPPING POWER OF A VEHICLE WHEEL ON A SUPPORT

The present invention relates to a system for improving the gripping power of a vehicle wheel on a support, comprising nozzles provided at the wheels and being supplied with liquid from a container, and means for controlling the liquid feed, preferably from the driver's seat in the vehicle.

Vehicles having tires covered with a coating that inhibits the gripping power of said tires represent a hazard and a disadvantage to common traffic, since it may become difficult to control such vehicles. Examples of covered tires are to be found in winter in connection with vehicles driving onto roads that are not salted, but covered with snow and possibly ice. The gripping power of the tires is considerably reduced and when driving on slippery slopes the vehicles, thus, often cause because of spinning wheels In some cases the driver will stop his vehicle at the edge of the road, go out of the vehicle, and put on chains. Such a stop on the road or at the edge of the road, however with the stopped vehicle, may cause some hazard as regards bumping or collision, and the parked vehicles also cause inconvenience to the other cars, etc.

From German Offenlegungsschrift No. 27 16 110 a washing system for tractor tires is known, said system being used to squirt out water onto the wheels, so that dirt and clay will be washed off. The water is expelled through nozzles provided on pipes which are, in turn, attached in the area of the vehicle tires. Such a water based system, however, could not be used in the winter. If water is used for cleaning the tires in the winter there will be a hazard of considerably reducing the gripping force of the tires, and in some cases they might be rendered quite unsuitable for use.

The known system can neither be used for applying any friction enhancing liquid, because liquids which are used in the winter usually are sticky and could easily clog the nozzles that are placed above the vehicle wheels. German Offenlegungsschrift No. 27 16 110, thus, does not disclose a system of applying a sticky liquid, nor does it disclose means cleaning the nozzles after application.

In German Offenlegungsschrift No. 31 07 219 a simultaneous application of an adhesive and a friction enhancing agent on vehicle tires is disclosed. Only manual methods are proposed to apply such agents. In a first case it is suggested to use a spray container with a pipe or hose-shaped connection. Said container contains an adhesive which is to adhere to the tire as well as adhering to, e.g. sand particles. According to said publication it is, furthermore, suggested to apply the adhesive by the aid of a brush. Alternatively, a pistol-like means comprising a lever is proposed for applying adhesive and sand. This method, however, requires the driver to stop his vehicle at the edge of the road, leave the vehicle, and carry out the necessary operations, and such stops have the disadvantages mentioned above.

Adhesives to be applied on a vehicle tire are today also in the market in spray cans. Such an adhesive, however, has a limited effect, dependent on the prevailing road conditions, and a spray can is very awkward to use, since it is necessary to leave the vehicle to spray the adhesive onto the tires. In addition to the fact that one has to leave the vehicle in order to apply the adhesive, said adhesive is very sticky. In more difficult conditions there is a great chance of getting both hands and clothes fouled with the adhesive.

It is an object of the present invention to remedy the above mentioned disadvantages. Thus, the object of the invention is to provide a system that can be activated from the driver's seat with the vehicle in motion and can be used for applying friction enhancing, sticky liquids without the nozzles of the system getting unnecessarily clogged.

In a system of the kind stated above, the object of the invention is achieved by the fact that the container contains a liquid enhancing the gripping power of the wheels in the winter on a winter slippery surface, and that the container is connected with a dispensing means for applying the liquid in dosed quantities, and with a source of compressed air for applying liquid and cleaning the nozzles.

This is a self-cleaning system, and each time only a dosed amount of liquid is applied. In a first embodiment said dispensing means comprises a dispensing storage means, said container being connected with a first branch of a three-way valve whereas another branch of said valve is connected with said storage means or reservoir, and the third branch of said valve is connected with the nozzles.

Said reservoir may be connected with a compressor via a first conduit for ejecting liquid from said reservoir through the second and third valve branch, and from said compressor a second conduit may extend directly connected to the nozzles. This combination will result in a satisfactory distribution of the liquid on the vehicle tires when the liquid is to be applied to the tread of the tires, the conduit extending directly from said compressor to the nozzles ensuring reliable cleaning of the nozzles after the application.

In another embodiment said dipensing or dosing means comprises a timing relay having two different time-adjustments, one first time interval guiding compressed air to the container and opening container valves to the nozzles, and another time interval being longer than the first mentioned and guiding the compressed air directly to the nozzles for distributing liquid and cleaning the nozzles.

Below, the invention will be disclosed in more detail with reference to the figures of the drawing, showing an embodiment of the system according to the invention.

Figure 1:
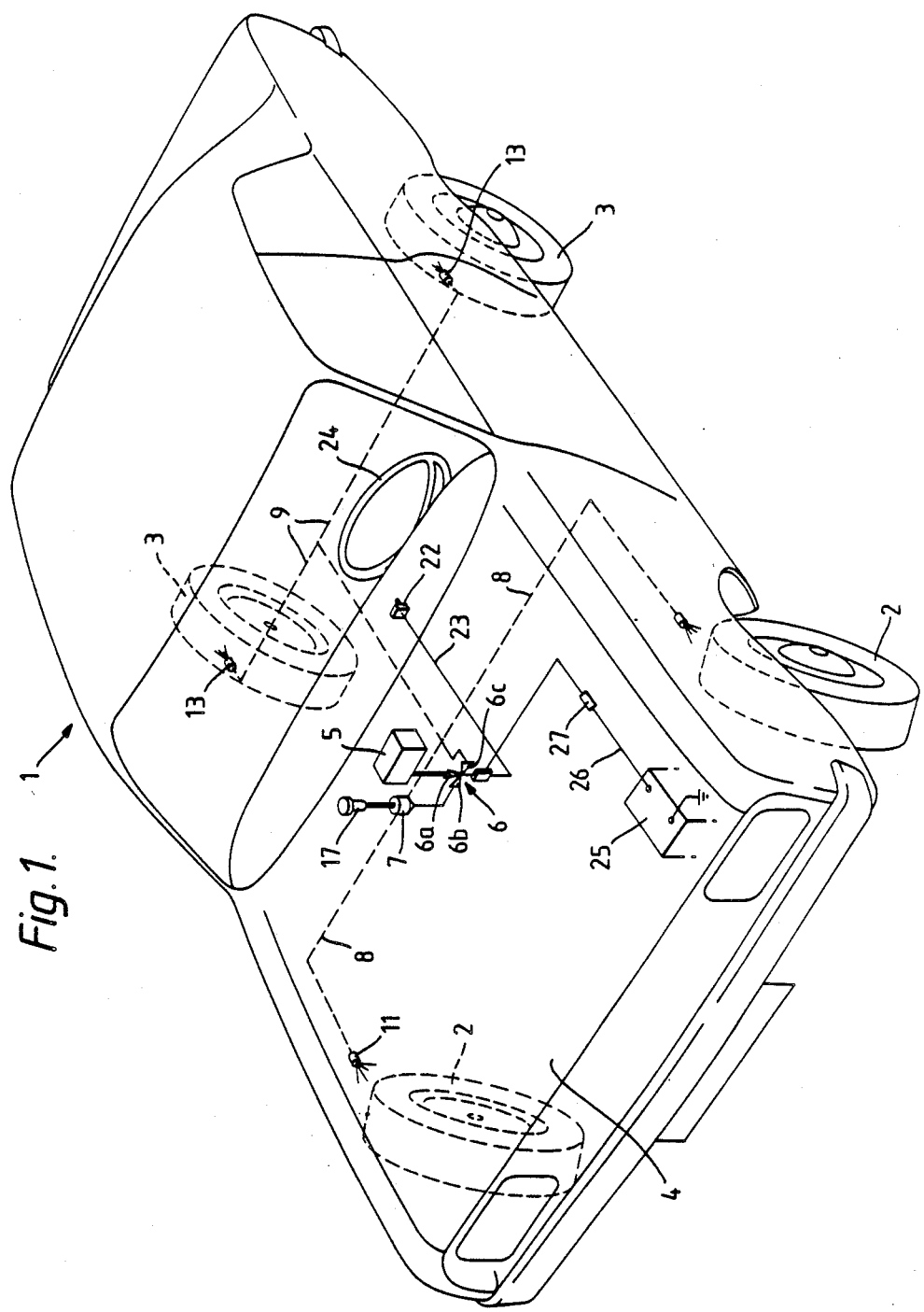
FIG. 1 is a diagrammatical view, partly transparent, of a vehicle provided with a first embodiment of the system according to the invention.

In FIG. 1 a vehicle, e.g. a private car, is designated 1, and its front wheels or steering wheels are designated 2 and its rear wheels or drive wheels are designated 3. In the engine space 4 a container 5 is arranged for a liquid which in the winter will enhance the gripping power of the wheels on a winter slippery surface, e.g. a resinous agent diluted in alcohol. The container 5 is connected with a three-way valve 6 via a first valve branch 6a, whereas a second valve branch 6b is connected with a dosing reservoir 7. A third valve branch 6c is connected with a series of hoses or pipes 8 and 9, with hoses 8 extending to front nozzles 11 mounted above the front wheels 2, respectively. The other hose 9 branches out to nozzles 13, respectively, arranged one above each rear wheel 3. It will be understood that conduits 8 and 9 may comprise other branches than those shown in the figures, and it will be understood that it is possible to arrange more than one nozzle above each drive wheel.

Figure 2:
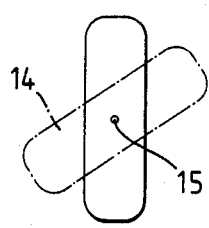
FIG. 2 is a sketch showing a steering wheel in two different positions.

Nozzle 11 near the steering wheels 2 of the vehicle are placed in the area of the turning axes of the front wheels, indicated by phantom lines 14 in FIG. 2. Thus, the jet from nozzle 11 will hit the area of the center portion 15 of the tire, irrespective of the turning position of wheel 2.

Figure 3:
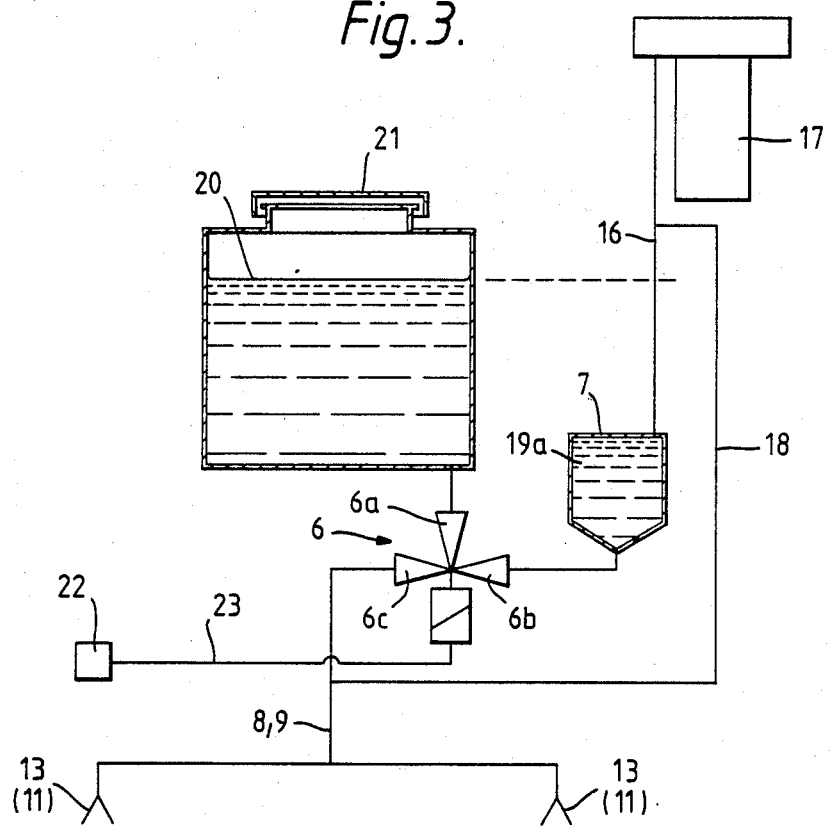
FIG. 3 shows the principle of the connections of said first embodiment for the present application system.

As will appear from FIG. 3, second valve branch 6b is connected with dosing reservoir 7, which, in turn, via a first conduit 16 is connected with a source of compressed air, e.g. a compressor 17, serving to force liquid from dosing reservoir 7, through second valve branch 6b and third valve branch 6c, as explained in more detail below.

From conduit 16, extending between dosing reservoir 7 and compressor 17, another conduit 18 branches off. It bridges dosing reservoir 7 and valve 6, i.e. it is connected directly with nozzles 11, 13 for blowing through said nozzles after they are used to apply the friction enhancing liquid in container 5 or dosing reservoir 7, respectively.

When the system is not used, the liquid 19 contained in container 5 will fill dosing reservoir 7 up to the equalizing level 20 determined by a relative mounting of container 5 and dosing reservoir 7. It will be understood that dosing reservoir 7 holds a smaller volume than liquid container 5 and is placed in the area of the container bottom, but with said first conduit 16 connecting reservoir 7 with compressor 17 projecting above the top 21 of container 5.

Before the system is used, the sticky liquid contained in container 5 will thus fill up dosing reservoir 7 and the second conduit 16 to the same level 20 as in container 5, the valve 6 in this condition permitting an open way between liquid container 5 and dosing reservoir 7 via valve branches 6a and 6b, whereas the third valve branch 6c is closed.

When the system is activated from the driver's seat, e.g. by the aid of switch 22 provided near the driver's seat 24, a signal via circuit 23 will close the valve connection with liquid container 5, i.e. valve branch 6a is closed, whereas valve branches 6b and 6c, i.e. the connection from dosing reservoir 7 to nozzles 13 and 14 are opened. Compressed air from compressor 17 will then force the liquid 19a in dosing reservoir 7 out into conduits 8, 9 and to nozzles 13, 14, at the same time as part of the compressed air is fed through conduit 18 directly to nozzles 11, 13 or to the conduits between valve 6 and nozzles 11, 13, as indicated in FIG. 3.

By the aid of the compressed air supplied by compressor 17 the liquid 19a will be well distributed at nozzles 11 and 13, and the compressed air will blow through the conduits and clean them after application.

The system may be electrically, hydraulically, or pneumatically driven, dependent on what power is disposable available or readily installed on the vehicle. In the shown embodiment an electrical drive is used. From a battery 25 a circuit extends to valve 6, and a fuse 27 is mounted in circuit 26.

In trucks, buses, etc. provided with their own pneumatic system, this will be used for controlling a magnet valve. In other vehicles small compressors driven by 12 volt or 24 volt engines may be used.

In private cars it may be suitable to use a common dosing reservoir with distribution to the drive wheels or to all four wheels. For trucks, vans and the like one dosing reservoir for each wheel or pair of wheels will probably be suitable to ensure a more uniform distribution of the tire adhesive.

If desired, there may be several containers each of them containing its own kind of friction enchancing liquid, and said containers may be provided with means for selective application of liquid to the system, dependent on weather and road conditions.

Figure 4:
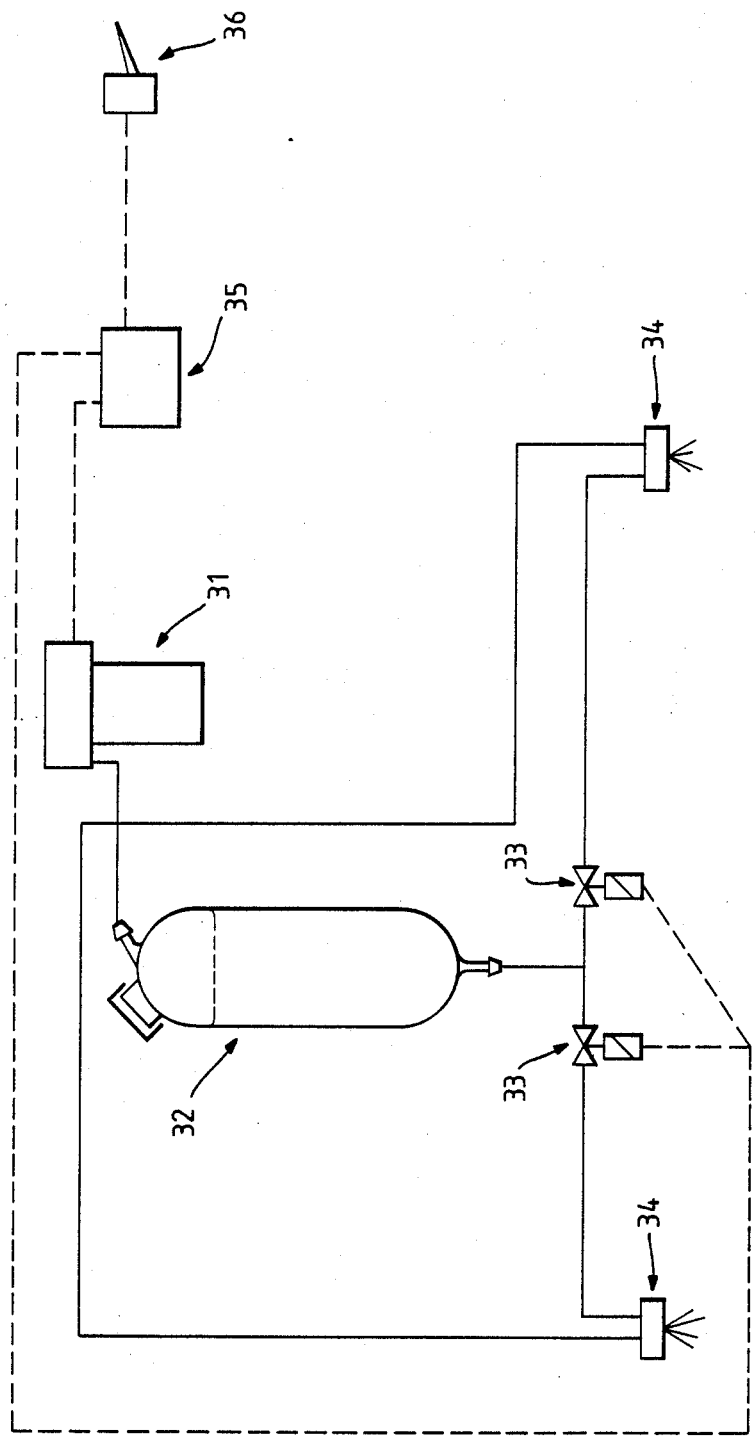
FIG. 4 shows the principle of another embodiment of the present application system.

In FIG. 4 another embodiment of the system according to the present invention is shown.

A compressor 31 is controlled by a timing relay 35 that is activated from the driver's seat by the aid of a switch 36. When switch 36 is activated compressor 31 will pressurize liquid container 32 at the same time as application nozzles 34 are supplied with compressed air for atomization of the tire adhesive in container 32. The liquid in liquid container 32 will be forced through the conduit system via magnet valves 33 and out into nozzles 34, respectively, where the compressed air will atomize the liquid and blow it down onto the tire tread.

Both compressor 31 and magnet valves 33 are controlled from an actuating switch 36 at the driver's seat via timing relay 35.

When relay 35 is activated by switch 36 the compressor 31 starts and both magnet valves 33 are opened.

After preset time-intervals, first the magnet valves 33 are closed, whereas compressor 31 continues during another preset interval. By the aid of this function of the double timing relay the desired dosing is achieved as well as "scavenging" of the nozzles after use.

Such a system with a pressure tank and a double timing relay will suitably be used for private cars.

A system with a dosage reservoir may suitably be used on trucks and other large vehicles.

It is common to both systems that they dispense a certain amount at a time, and that the system at the same time is cleaned after use.

We claim:

1. A system for improving the gripping power of vehicle wheels on a surface, comprising nozzles near the wheels supplied with a liquid from a container and means for controlling the liquid supply, characterized in that:

said container holds a liquid which in the winter enhances the gripping power of the wheels on a winter slippery surface, said system includes a compressor for using the air therefrom for applying the liquid and for cleaning the nozzles, said container is connected with a dosing means for dosed application of the liquid, said dosing means comprises a dosing reservoir, said container being connected with a first branch of a three-way valve, said dosing reservoir being connected with a second branch of said valve and said nozzles being connected with a third branch of said valve, said dosing reservoir is connected with said compressor via a first conduit for forcing the liquid out of said dosing reservoir through said second the third valve branches to said nozzles, and said compressor is directly connected to said nozzles to clean the same via a second conduit which bypasses said reservoir and said valve.

2. System as stated in claim 1, characterized in that said dosing reservoir (7) holds a smaller volume (19a) than said liquid container (5) and is placed in the area of the bottom of said container (5), but with said first conduit (16) connecting said reservoir (7) with said compressor (17) projecting above the top (21) of said container (5).

3. System as stated in claim 1, characterized in that there is a common dosing reservoir for the drive wheels of a vehicle or for all its wheels.

4. A system for improving the gripping power of vehicle wheels on a surface, comprising nozzles near the wheels supplied with a liquid from a container and means for controlling the liquid supply, characterized in that:

said container holds a liquid which in the winter enhances the gripping power of the wheels on a winter slippery surface, said system includes a compressor for using the air therefrom for applying the liquid and for cleaning the nozzles, said container is connected with a dosing means for dosed application of the liquid, said dosing means comprises:

first conduit means connecting said compressor to said container for forcing liquid therefrom to said nozzles, valve means controlling the supply of liquid from said container to said nozzles, second conduit means connecting said compressor directly to said nozzles for cleaning the same, and a timing relay with two different time adjustments, a first timing interval guiding compressed air to said container and opening said valve means to supply said liquid to said nozzles and a second time interval longer than said first time interval guiding compressed air directly to said nozzles to clean the same after the supply of liquid thereto has been shut off by the closing of said valve means.

5. System as stated in claim 4, characterized in that said timing relay (35) is a double timing relay, one timing relay being connected with compressor (31), and the other relay being connected with container valves (33).

6. System as stated in claim 1 or 4, characterized in that the container (5) holds a liquid (19) comprising a resinous matter diluted in alcohol.

* * * * *